US012099181B2

(12) United States Patent
Schoeler

(10) Patent No.: US 12,099,181 B2
(45) Date of Patent: Sep. 24, 2024

(54) METHOD FOR CENTERING OPTICAL ELEMENTS

(71) Applicant: OLYMPUS WINTER & IBE GMBH, Hamburg (DE)

(72) Inventor: Uwe Schoeler, Hoisdorf (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 1003 days.

(21) Appl. No.: 17/024,795

(22) Filed: Sep. 18, 2020

(65) Prior Publication Data
US 2021/0003837 A1 Jan. 7, 2021

Related U.S. Application Data

(63) Continuation of application No. PCT/EP2019/055534, filed on Mar. 6, 2019.

(30) Foreign Application Priority Data

Mar. 20, 2018 (DE) .......................... 102018106469.1

(51) Int. Cl.
*G02B 23/24* (2006.01)
*G02B 7/02* (2021.01)
(Continued)

(52) U.S. Cl.
CPC ............. *G02B 23/243* (2013.01); *G02B 7/02* (2013.01); *G02B 7/022* (2013.01);
(Continued)

(58) Field of Classification Search
CPC .. G02B 23/24; G02B 23/243; G02B 23/2476; G02B 7/02; G02B 7/022; G02B 7/026;
(Continued)

(56) References Cited

U.S. PATENT DOCUMENTS 4,440,157 A 4/1984 Shishido
6,398,723 B1 6/2002 Kehr et al.
(Continued)

FOREIGN PATENT DOCUMENTS

DE 19750685 C2 8/2003
JP S60-208718 A 10/1985
(Continued)

OTHER PUBLICATIONS

English translation of JP S60208718. (Year: 1985).*
(Continued)

*Primary Examiner* — Jie Lei
(74) *Attorney, Agent, or Firm* — Scully, Scott, Murphy & Presser, P.C.

(57) ABSTRACT

A method for centering an optical element in an optical system for an endoscope, wherein the optical element has an optical axis aligned in the optical system such that the optical axis of the optical element coincides with an optical axis of the optical system, the method including: forming recesses into a circumference of the optical element, wherein in a cross-sectional plane of the optical element each recess includes a deepest point which has a smallest distance to the optical axis of the optical element, and the deepest points are located in the cross-sectional plane of the optical element on a circle, a center of the circle being located on the optical axis of the optical element; inserting a centering material into each of the recesses; and aligning the optical element in the optical system using the centering material in each of the recesses.

18 Claims, 4 Drawing Sheets

(51) Int. Cl.
*H04N 5/225* (2006.01)
*H04N 23/55* (2023.01)
*H04N 23/50* (2023.01)

(52) U.S. Cl.
CPC ......... *G02B 23/2476* (2013.01); *H04N 23/55* (2023.01); *H04N 23/555* (2023.01)

(58) Field of Classification Search
CPC ........ G02B 7/023; G02B 7/021; G02B 7/025; G02B 7/10; G02B 7/102; G02B 7/006; G02B 7/09; G02B 7/14; H04N 23/55; H04N 23/555; H04N 5/225; H04N 5/2254; H04N 2005/2255; G03B 5/06; G03B 3/02; G03B 3/10; G03B 17/14
USPC ........ 359/811, 819, 821–823, 826, 694, 699, 359/700, 701, 704; 396/529, 530, 533, 396/535, 544
See application file for complete search history.

(56) References Cited

U.S. PATENT DOCUMENTS

2004/0165288 A1  8/2004  Daikoku
2006/0274436 A1* 12/2006  Inamoto ................ G02B 7/023
                                                    359/819

FOREIGN PATENT DOCUMENTS

JP        S62-149013 U       9/1987
JP        H01-183612 A       7/1989
JP        H01-191115 A       8/1989
WO        WO 2011/086949 A1  7/2011

OTHER PUBLICATIONS

English translation of JP H01183612. (Year: 1989).*
International Search Report dated Jun. 3, 2019 issued in PCT/EP2019/055534.

* cited by examiner

METHOD FOR CENTERING OPTICAL ELEMENTS

CROSS-REFERENCE TO RELATED APPLICATION

The present application is a continuation of PCT/EP2019/055534 filed on Mar. 6, 2019, which is based upon and claims the benefit to DE 10 2018 106 469.1 filed on Mar. 20, 2018, the entire contents of each of which are incorporated herein by reference.

BACKGROUND

Field

The present disclosure relates to a method for centering at least one optical element, and more particularly a method for centering at least one lens, in an optical system for an endoscope, wherein the optical element has an optical axis and is aligned in the optical system in such a way that the optical axis of the optical element coincides with an optical axis of the optical system. The present disclosure also relates to an optical element for an endoscope as well as an optical system for an endoscope.

Prior Art

When using endoscopes, good image quality is necessary to enable, for example, operating doctors to have a good view of the field of operation. In video endoscopes, this requires the use of image sensors with increasingly high resolution. In order to utilize this higher resolution, the optical elements, for example the lenses, as well as their alignment relative to each other in the endoscope also have to meet strict requirements. It is thus required that the optical axes of all the optical elements in the optical system of the endoscope coincide as exactly as possible with the optical axis of the optical system. If, however, the deviation of the optical axis of an optical element from the optical axis of the optical system is too large, the image quality of the endoscope decreases.

In order to arrange the optical axes of the optical elements on the optical axis of the optical system, the optical elements are usually processed by means of a grinding method. Optical elements with a tolerance of the diameter of approximately 20 μm can be provided in this way. By inserting these optical elements into an optical holder, which is also manufactured with high precision, of the optical system, the optical elements are aligned along the common optical axis.

By means of such a grinding method, however, the tolerances required when using high-resolution image sensors are not achieved. Instead, in this case, according to the prior art the optical elements are enclosed in a brass sleeve which is then turned with a special centering turning machine. In this way, much smaller tolerances of the diameter are achieved.

Centering via turning is a time-intensive process. In addition, the diameter of the optical element is increased by approximately 200 μm to 300 μm by being enclosed in the brass sleeve, which may make it necessary to enlarge the endoscope diameter or reduce the diameter of the optical element.

Referring specifically to FIG. 1, the same schematically shows an optical system 10 according to the prior art in a cross-section. An optical element 20 is inserted in an optical holder 14 of the optical system 10. The optical element 20 is embedded in a sleeve 16, for example a brass sleeve. However, since the mechanical axis of the brass sleeve 16 and the optical axis 22 of the optical element 20 do not coincide, the optical axis 12 of the optical system 10 and the optical axis 22 of the optical element 20 also do not coincide. In order to solve this problem, according to the prior art the brass sleeve 16 is typically centered via turning in such a way that the optical axes 12 and 22 coincide. However, this centering method via turning is very work-intensive and requires the use of a sleeve 16, which limits the maximum diameter of the optical element 20.

FIG. 2 schematically shows an optical element 20 in a cross-sectional diagram. The shape of the optical element 20, which is described by the circumference 26 (solid line), is not exactly circular due to the manufacturing process. The shown deviation from a circular shape is, however, shown strongly exaggerated for illustrative purposes. The optical axis 22 of the optical element 20 as the center point of the curvatures of the optical face of the element 20 is predetermined by the manufacturing process. This results in an outer circle 21 (dotted-dashed line) which describes the largest possible circle which can be drawn in the cross-sectional plane 27 of the optical element 20, the center of which is the optical axis 22. In order to obtain, for example by means of a grinding method, an optical element 20 with an exactly circular circumference, the center of which is the optical axis 22, the difference of the faces encompassed by the circumference 26 and by the outer circle 21 would have to be ground off. This is very complex and presents the danger of destroying the optical element 20 due to fractures.

SUMMARY

An object s to provide a method for centering at least one optical element in an optical system for an endoscope, an optical element, and an optical system which enables exact and space-saving centering of the optical element in the optical system with low time expenditure.

Such object can be achieved by a method for centering at least one optical element, such as a lens, in an optical system for an endoscope, wherein the optical element has an optical axis and is aligned in the optical system in such a way that the optical axis of the optical element coincides with an optical axis of the optical system, wherein at least two recesses, such as grooves, are introduced into a circumference of the optical element, wherein in a cross-sectional plane of the optical element each recess comprises a deepest point which has a smallest distance to the optical axis of the optical element, and the deepest points are located in the cross-sectional plane of the optical element on a circle, the center of which is located on the optical axis of the optical element, wherein centering elements are inserted into the recesses and the optical element is aligned in the optical system by means of the centering elements.

The optical elements can, for example, be concave or convex lenses. In the method, the recesses are introduced into the optical element in such a way that the shape of each recess remains constant in the direction parallel to the optical axis of the optical element. In this case, the recesses each run exactly parallel to the optical axis of the optical element. This means that the use of centering sleeves as well as alternatively a complex grinding of the optical elements into a circular shape which is concentric with the optical axis of the optical element can be dispensed with.

The recesses can be introduced into the optical element by means of an ultrashort pulse laser.

By inserting centering elements into the recesses, the optical system can be centered in the optical system in such a way that the optical axis of the optical element coincides with the optical axis of the optical system. For this purpose, for example, the centering elements can be clamped between the recesses and an optical holder of the optical system. This enables a self-centering alignment of the optical element in the optical system.

The recesses can have a basically U-shaped cross-section in the cross-sectional plane of the optical element. A basically U-shaped cross-section is understood in this context to mean that not only a U shape with two legs and a rounding is comprised, but also shapes in which the legs and in particular also parts of the rounding are missing. Recesses with a cross-section in the shape of a circle segment are thus also comprised. In the case of such a basically U-shaped cross-section, the deepest point of the recess is advantageously exactly determined.

The optical element is produced from an optically transparent material and the recesses are introduced directly into the optically transparent material. The optically transparent material is, for example, optical glass.

Introducing the recesses directly into the optically transparent material of the optical element can make the use of a sleeve unnecessary so that an enlargement of the diameter of the endoscope or a reduction of the diameter of the optical element is avoided. The recesses can have a depth of 100 to 300 μm, measured from the circumference in the direction of the optical axis of the optical element. The recesses are thus so small in comparison with the cross-sectional face of the optical element that their influence on the optical properties of the optical element is negligible.

Three recesses can be introduced into the optical element, wherein the angular distance of the recesses to each other, with reference to the center of the circle, can be 120 degrees. According to this embodiment, one centering element can be inserted into each of the recesses, which clamp themselves with the optical holder of the optical system in order to center the optical element. By using three recesses and three centering elements, three contact points with the optical holder are also present so that the optical element is prevented from slipping. When the angular distance, with reference to the center of the circle, between the recesses is 120 degrees in each case, the recesses are distributed evenly on the circumference of the optical element, whereby an even distribution of the arising forces on the centering elements is achieved.

Centering wires can be inserted into the recesses as centering elements, wherein the centering wires extend parallel to the optical axis of the optical element. The extension or respectively alignment of the centering wires parallel to the optical axis of the optical element can simplify the alignment of the optical element in the optical system. The diameter of the centering wires can be chosen in such a way that only the centering wires and not the optical element come into contact with an optical holder of the optical system. Since all the centering wires run exactly parallel to the optical axis of the optical element, the optical element is automatically centered in the optical system when an optical system with a corresponding diameter is chosen.

The centering wires can be produced from a shape memory alloy and have a basically circular cross-section in an original shape, wherein the diameter of the centering wires in a first direction is reduced by rolling before insertion into the recesses, wherein the first direction corresponds to a radial direction of the circle in the inserted state of the centering wires, wherein the centering wires are heated in the inserted state, such as by conducting an electrical current through the centering wires, in such a way that they once again assume their original shape and as a result lead to clamping, through which the optical element is centered in the optical system. By using a shape memory alloy, the centering wires can initially be brought into a shape before insertion in which the optical element with the inserted centering wires can be easily inserted into the optical holder of the optical system. Through subsequent warming of the centering wires, these once again assume their circular original cross-section and clamp themselves as a result between the recesses of the optical element and the optical holder of the optical system. In this manner, the optical element is independently centered in the optical system in such a way that the optical axes of the optical element and of the optical system coincide.

At least two optical elements can be centered in the optical system, wherein the recesses in all the optical elements can have the same angular distances to each other, with reference to the center of the circle, wherein the optical elements are arranged one behind the other and the centering wires are then inserted into the recesses, wherein the optical elements are aligned in the optical system by means of the centering wires in such a way that the optical axes of the optical elements coincide with the optical axis of the optical system.

Configuring the centering elements as centering wires makes it possible to center a series of optical elements in the optical system by means of the same centering wires in such a way that the optical axes of all the optical elements coincide with the optical axis of the optical system. This requires that the recesses in all the optical elements have the same angular distances, with reference to the center of the circle, so that the wires can be inserted evenly into the recesses of all the optical elements. Preferably, by heating the inserted centering wires, all the optical elements are centered in the optical system at the same time.

Such object can also be achieved by an optical element for an endoscope, comprising an optical axis, wherein at least two recesses are present in a circumference of the optical element, in a cross-sectional plane of the optical element each recess can comprise a deepest point which has a smallest distance to the optical axis of the optical element, and the deepest point is located in the cross-sectional plane of the optical element on a circle, the center of which is located on the optical axis of the optical element.

The recesses can have a basically U-shaped cross-section in the cross-sectional plane of the optical element.

The optical element can be produced from an optically transparent material and the recesses can be introduced directly into the optically transparent material.

Three recesses can be introduced into the optical element, wherein the angular distance of the recesses to each other, with reference to the center of the circle, can be 120 degrees.

The object can also be achieved by an optical system for an endoscope, comprising at least one optical element of one of the previously described embodiments, wherein the optical element is centered in the optical system by means of centering elements inserted into the recesses in such a way that the optical axis of the optical element coincides with an optical axis of the optical system.

The centering elements can be centering wires that extend parallel to the optical axis of the optical element.

The centering wires can have a basically circular cross-section and can be produced from a shape memory alloy so that they can be returned to their original shape by heating.

At least two optical elements can be centered in the optical element, wherein the recesses in all the optical elements can have the same angular distance to each other, with reference to the center of the circle, wherein the optical elements are arranged one behind the other in the direction of the optical axes of the optical elements and the centering wires are inserted into the recesses, wherein the optical elements are aligned in the optical system by means of the centering wires in such a way that the optical axes of the optical elements coincide with the optical axis of the optical system.

The optical element and the optical system also embody the same advantages, features and properties as the previously described method.

BRIEF DESCRIPTION OF THE DRAWINGS

Further features will become apparent from the description of the embodiments together with the claims and the attached drawings. Embodiments can fulfill individual features or a combination of several features.

The embodiments are described below, without restricting the general idea of the invention, using exemplary embodiments with reference to the drawings, express reference being made to the drawings with regard to all details that are not explained in greater detail in the text. In the following.

In the drawings, the same or similar elements and/or parts are provided with the same reference numbers in order to prevent the item from needing to be reintroduced.

DETAILED DESCRIPTION

Figure 1:
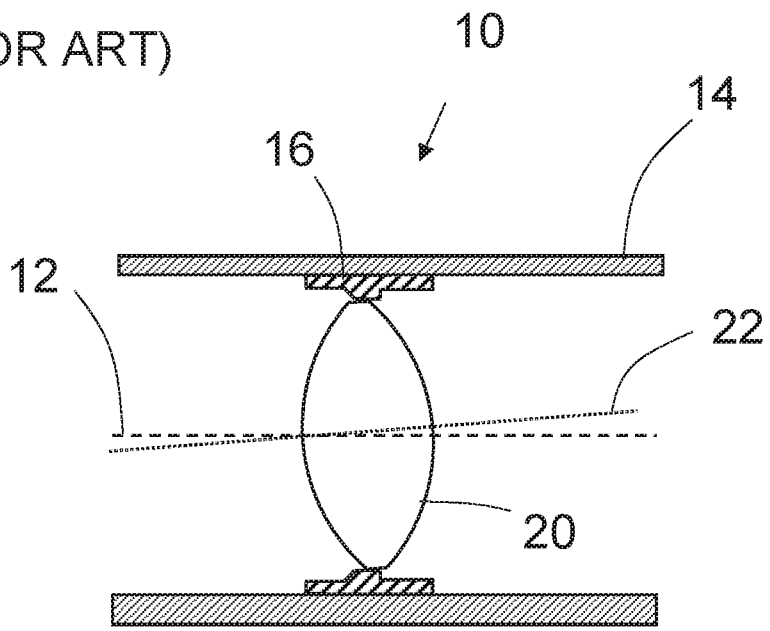
FIG. 1 illustrates a schematic diagram of an optical element in an optical system according to the prior art.
Figure 2:
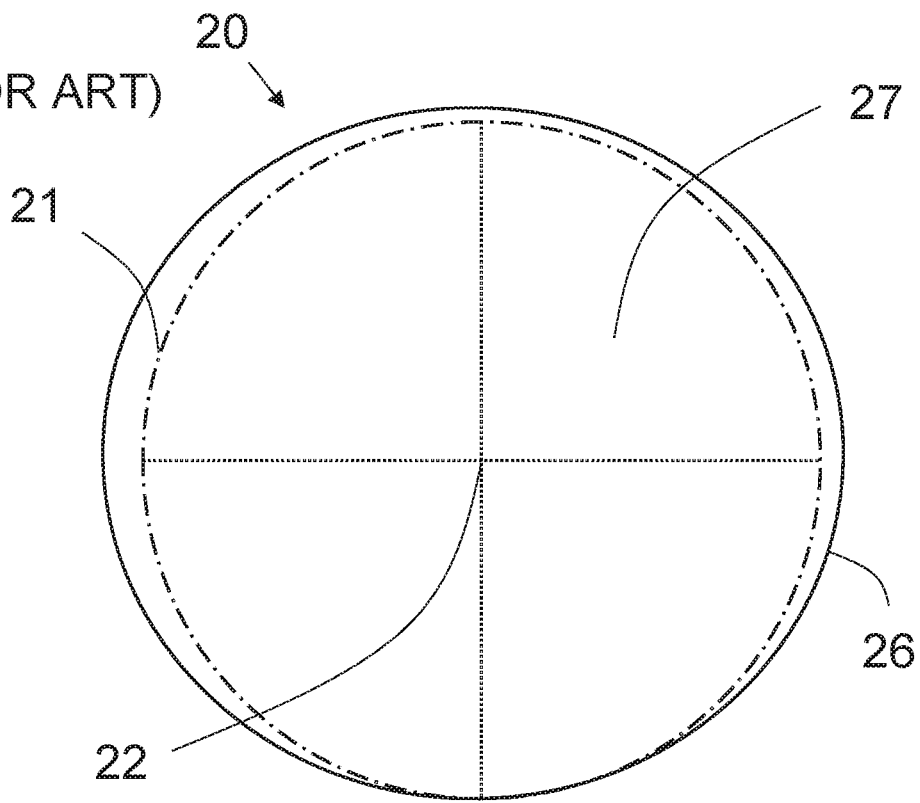
FIG. 2 illustrates a schematic diagram of an optical element before the present method is performed.
Figure 3:
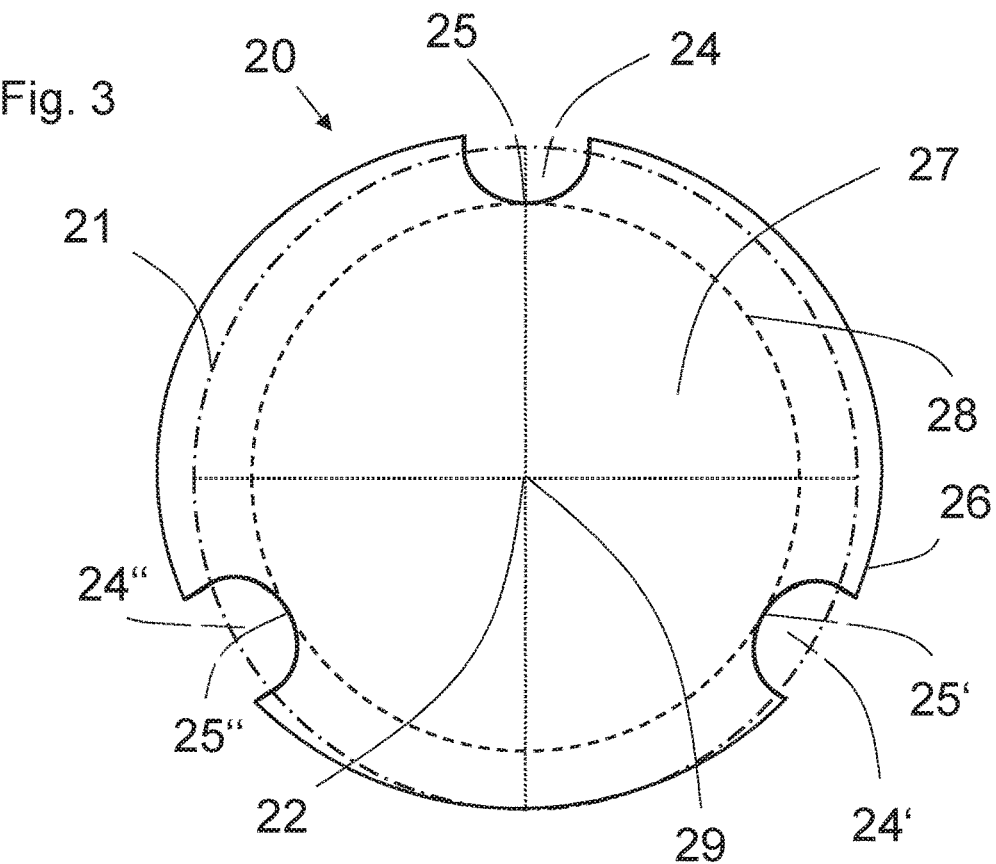
FIG. 3 illustrates a schematic diagram of an optical element with recesses.

Referring now to FIG. 3, there is shown an optical element 20 after recesses 24, 24', 24" in the form of basically U-shaped grooves have been introduced into the optical element 20. According to the exemplary embodiment shown in FIG. 3, three grooves 24, 24', 24" are introduced into the optical element 20 which are evenly distributed along the circumference 26, which is to say have angular distances of 120 degrees. The recesses 24, 24', 24" are approximately 100 μm to 300 μm deep, measured from the circumference 26 in the direction of the optical axis 22. The deepest points 25, 25', 25" of the recesses 24, 24', 24" are located on a circle 28 (dotted line), the center 29 of which is located on the optical axis 22. The circle 28 is somewhat smaller than the outer circle 21 so that the recesses 24, 24', 24" have the required depth.

The shape of the recesses 24, 24', 24" is the same along the optical axis 22 in all cross-sectional planes 27 of the optical element 20. This is necessary so that the optical element is aligned parallel to the optical axis 22 by the insertion of centering elements or respectively centering wires.

Figure 4A:
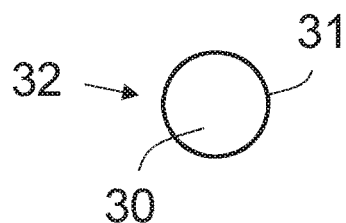
FIGS. 4a to 4c illustrate a schematic cross-sectional diagram of a centering wire in the original shape, after rolling the centering wire and after heating the centering wire.
Figure 4B:
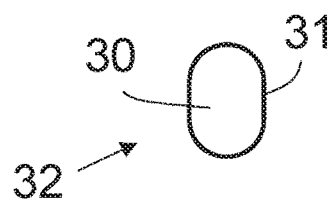
Figure 4C:
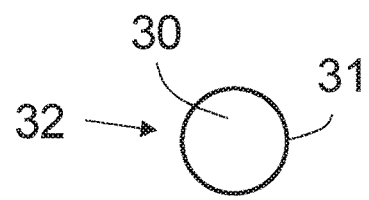

FIG. 4a to FIG. 4c schematically show a cross-sectional diagram of a centering element 32, in this case a centering wire 30. FIG. 4a shows the cross-section 31 of the centering wire 30 in its original shape, which has a circular cross-section 31. Before insertion into the recesses 24, 24', 24", the centering wires 30 are rolled so that they have a shape with a diameter that is reduced by approximately 15% in one direction, as shown in FIG. 4b. Since the centering wires 30 are manufactured from a shape memory alloy, they once again assume their original shape after heating, as shown in FIG. 4c.

Figure 5:
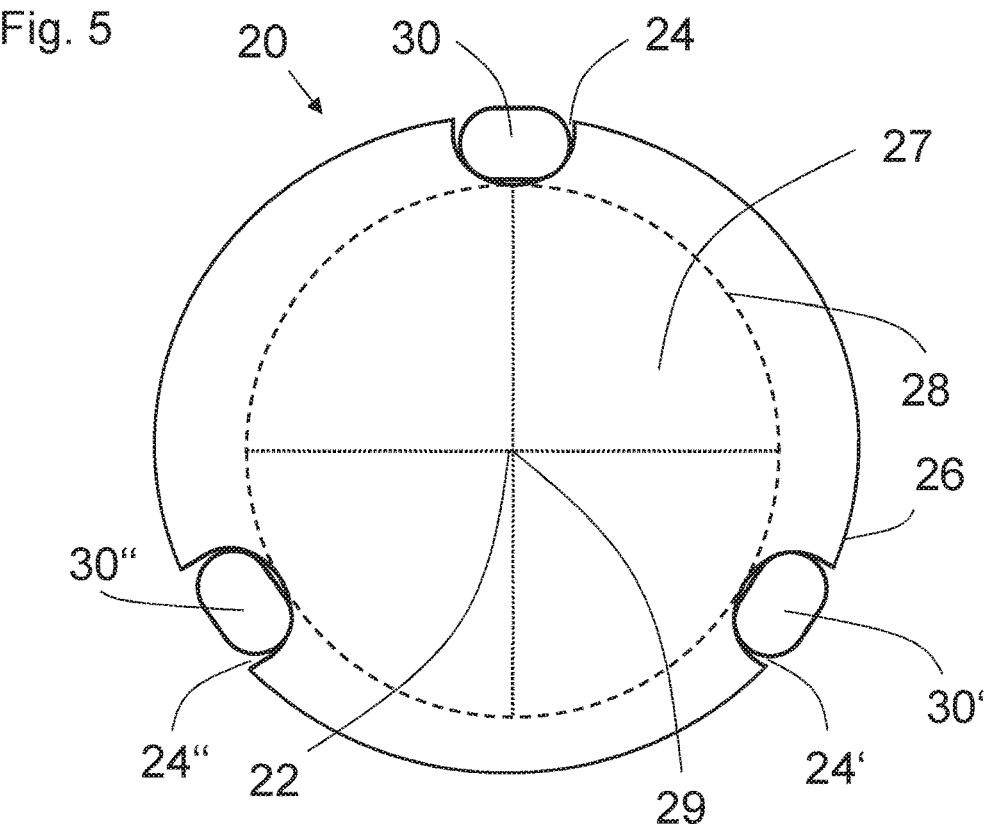
FIG. 5 illustrates a schematic diagram of an optical element with centering wires inserted into the recesses.

FIG. 5 schematically shows the optical element 20 from FIG. 3, wherein, however, the centering wires 30, 30', 30" have been inserted into the recesses 24, 24', 24". Before insertion, the centering wires 30, 30', 30" were processed by means of a rolling process so that they have a reduced diameter in a first direction, the radial direction of the optical element 20.

Figure 6:
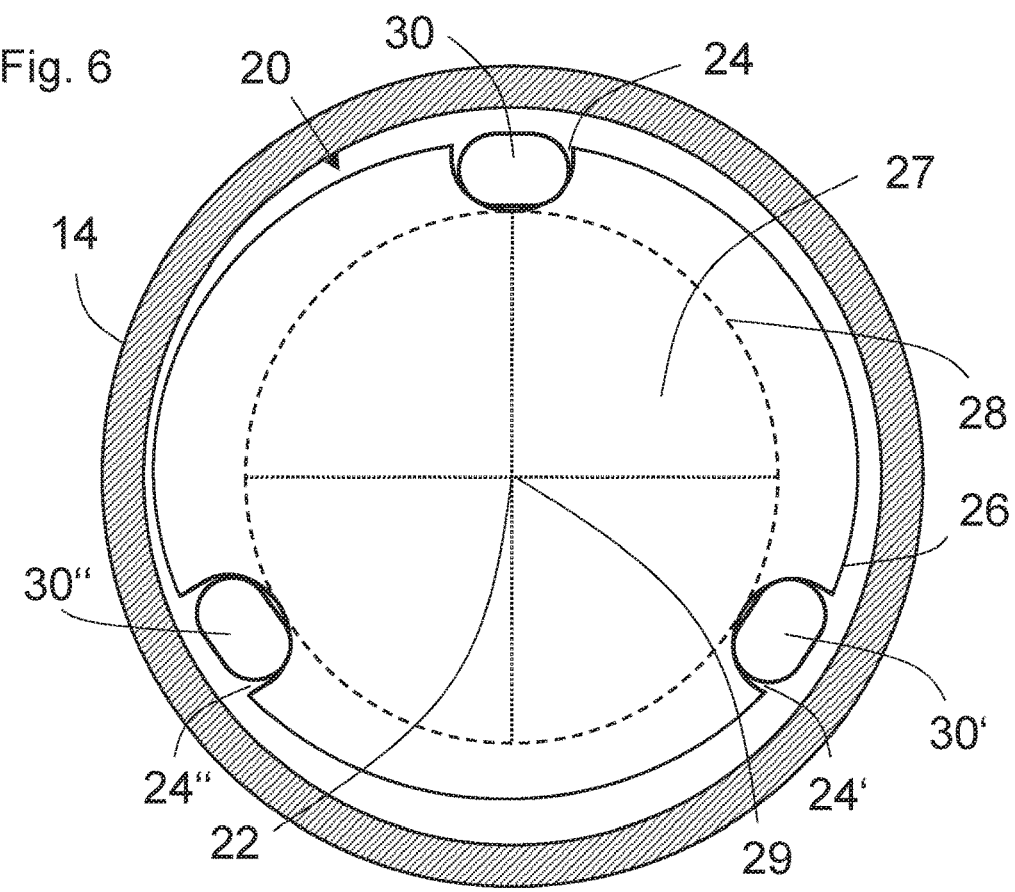
FIG. 6 illustrates a schematic diagram of an optical element with centering wires inserted into the recesses in an optical holder of an optical system.

In FIG. 6, the optical element 20 from FIG. 5 is shown, wherein the optical element 20 with the centering wires 30, 30', 30" has been introduced into the optical holder 14 of the optical system 10. Since the diameter of the centering wires 30, 30', 30" was reduced by rolling, the centering wires 30, 30', 30" have a certain play in the recesses 24, 24', 24". This simplifies the introduction of the optical element 20 with the centering wires 30, 30', 30" into the optical holder 14.

Figure 7:
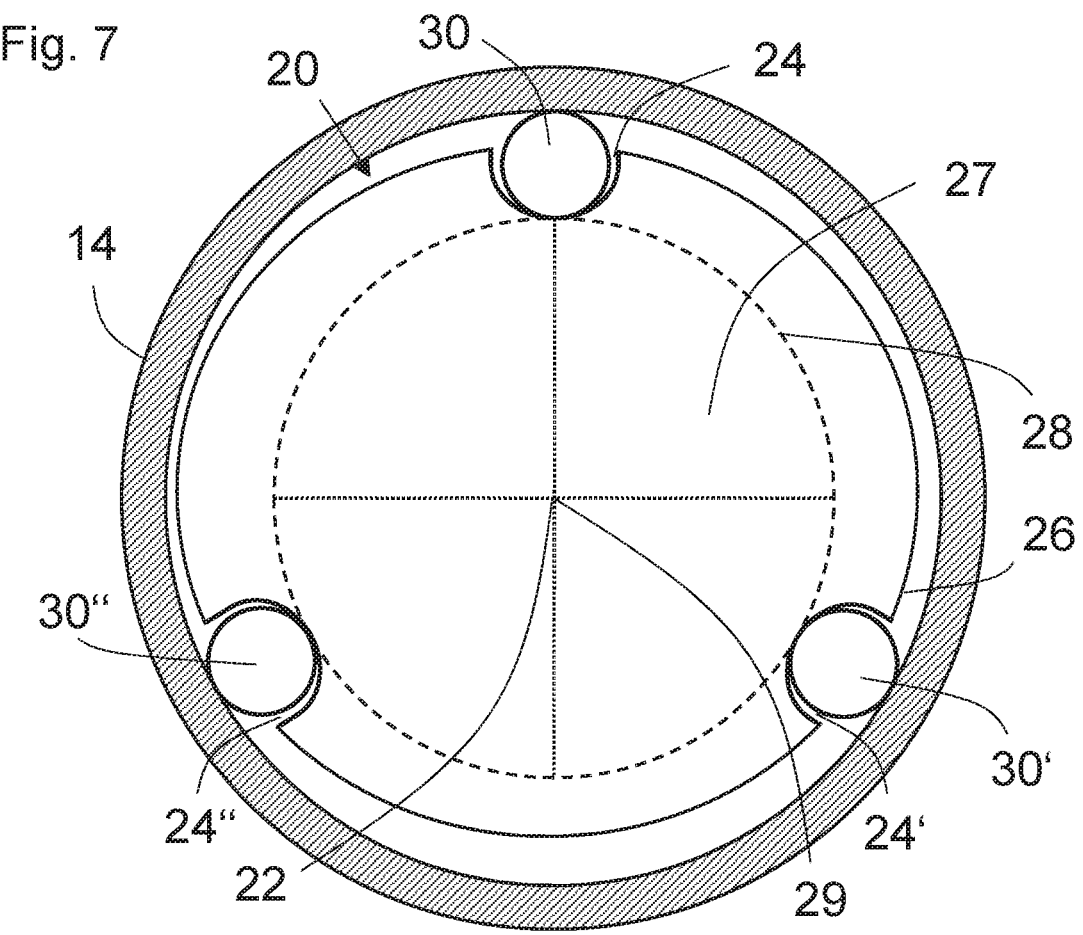
FIG. 7 illustrates a schematic diagram of an optical element centered in an optical holder of an optical system by means of centering wires.

In FIG. 7, the optical element 20 is shown in the optical system from FIG. 6 after the centering wires 30, 30', 30" have been heated. This occurs, for example, by conducting an electrical current through the centering wires 30, 30', 30". As described in connection with FIG. 4a to FIG. 4c, the centering wires 30, 30', 30" once again assume their circular original shape. This leads to a clamping of the centering wires 30, 30', 30" between the recesses 24, 24', 24" and the optical holder 14. Since the centering wires 30, 30', 30" rest directly on the circle 28, the center 29 of which is located on the optical axis 22 of the optical element 20, this clamping centers the optical element 20 in the optical system 10 in such a way that the optical axis 22 of the optical element 20 exactly coincides with the optical axis 12 of the optical system 10.

Figure 8:
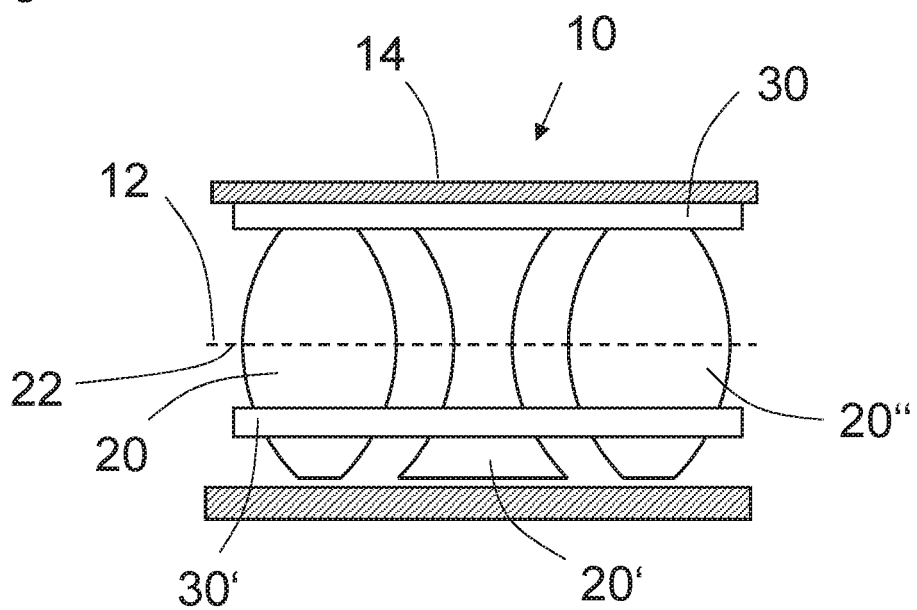
FIG. 8 illustrates a schematic side view of an optical system with three optical elements centered by means of centering wires.

FIG. 8 schematically shows a side view of an embodiment of the optical system 10. Two convex lenses 20, 20" and one concave lens 20' are centered in the optical holder 14 of the optical system 10. Of course, any number of optical elements which have an optical axis can be centered in an optical system 10. The diagram in FIG. 8 is only exemplary.

The diagram shown in FIG. 8 runs directly through the plane from FIG. 7 through which the optical axis 22 runs. In this diagram, it can be seen that the centering wire 30 situated at the top in this diagram rests directly on the optical holder 14. In FIG. 8, the centering wire 30' is also shown, although this is not located in the plane shown. The region of the optical holder 14 on which the centering wire 30' rests is not shown.

With the clamping of the centering wires 30, 30', 30" in the optical holder 14 of the optical system 10, it is achieved that all the optical elements 20, 20', 20" are centered in the optical system in such a way that their optical axes 22 exactly coincide with the optical axis 12 of the optical system.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS

10 Optical system
12 Optical axis
14 Optical holder
16 Sleeve
20, 20', 20" Optical element
21 Outer circle
22 Optical axis
24, 24', 24" Recesses
25, 25', 25" Deepest point
26 Circumference
27 Cross-sectional plane
28 Circle
29 Center
30, 30', 30" Centering wires
31 Cross-section
32 Centering elements

What is claimed is:

1. A method for centering at least one optical element in an optical system for an endoscope, wherein the at least one optical element has an optical axis and is aligned in the optical system such that the optical axis of the at least one optical element coincides with an optical axis of the optical system, the method comprising:
    forming at least two recesses into a circumference of the at least one optical element, wherein in a cross-sectional plane of the at least one optical element each recess of the at least two recesses comprises a deepest point which has a smallest distance to the optical axis of the at least one optical element, and the deepest points are located in the cross-sectional plane of the at least one optical element on a circle, a center of the circle being located on the optical axis of the at least one optical element;
    inserting a centering wire into each of the at least two recesses for centering the at least one optical element in the optical system such that the optical axis of the optical element coincides with an optical axis of the optical system, each centering wire being formed of a shape memory alloy and configured to change from a first cross-sectional shape to a second cross-sectional shape upon being heated, the second cross-sectional shape having at least a first portion with a smaller cross-sectional dimension than a corresponding portion of the first cross-sectional shape; and
    aligning the at least one optical element in the optical system using the centering wire positioned in each of the at least two recesses such that heating the centering wires changes the second cross-sectional shape to the first cross-sectional shape to center the at least one optical element in the optical system.

2. The method according to claim 1, wherein the at least one optical element is a lens.

3. The method according to claim 1, wherein the at least two recesses comprise at least two grooves.

4. The method according to claim 1, wherein the recesses have a U-shaped cross-section in the cross-sectional plane of the at least one optical element.

5. The method according to claim 1, wherein the at least one optical element is formed from an optically transparent material and the forming of the at least two recesses comprising directly forming the at least two recesses into the optically transparent material.

6. The method according to claim 1, wherein the forming of the at least two recesses comprises forming three recesses into the at least one optical element.

7. The method according to claim 6, wherein the three recesses are formed such that an angular distance of the three recesses relative to each other, with reference to the center of the circle, is 120 degrees.

8. The method according to claim 1, wherein the centering wires extend parallel to the optical axis of the at least one optical element.

9. The method according to claim 8, wherein the heating comprises conducting an electrical current through the entering wires.

10. The method according to claim 8, wherein the at least one optical element comprises at least two optical elements, the at least two recesses in each of the at least two optical elements have the same angular distance relative to each other, with reference to the center of the circle, wherein the at least two optical elements are arranged one behind the other in a direction of the optical axis of the optical system and the centering wires are inserted into the at least two recesses for each of the at least two optical elements such that the optical axes of the at least two optical elements coincide with the optical axis of the optical system.

11. An optical system for use with an endoscope, the optical system comprising:
    at least one optical element for the endoscope, the optical element comprising:
        a body having an optical axis, at least two recesses are formed in a circumference of the body, wherein in a cross-sectional plane of the body each recess comprises a deepest point which has a smallest distance to the optical axis of the body, and the deepest points are located in the cross-sectional plane on a circle, a center of the circle being located on the optical axis of the body; and
        a centering wire disposed in each of the at least two recesses for centering the at least one optical element in the optical system such that the optical axis of the optical element coincides with an optical axis of the optical system;
    wherein the centering wires extend parallel to the optical axis of the optical element;
    each centering wire being formed of a shape memory alloy and configured to change from a first cross-sectional shape to a second cross-sectional shape upon being heated, the second cross-sectional shape having at least a first portion with a smaller cross-sectional dimension than a corresponding portion of the first cross-sectional shape; and
    the first portion of the second cross-sectional shape of each centering wire is positioned in each of the at least two grooves such that heating the centering wires changes the second cross-sectional shape to the first cross-sectional shape to center the at least one optical element in the optical system.

12. The optical system according to claim 11, wherein the at least one optical element comprises at least two optical elements each centered in the optical system, wherein the at least two recesses in each of the at least two optical elements have the same angular distance relative to each other, with reference to the center of the circle, wherein the at least two optical elements are arranged one behind the other in a direction of the optical axis of the optical system and the centering wires are inserted into the at least two recesses for each of the at least two optical elements such that the optical axes of the at least two optical elements coincide with the optical axis of the optical system.

13. The optical system according to claim 11, wherein the at least two recesses have a U-shaped cross-section in the cross-sectional plane.

14. The optical system according to claim 11, wherein the body is formed from an optically transparent material and the at least two recesses are formed directly into the optically transparent material.

15. The optical system according to claim 11, wherein the at least two recesses comprises three recesses.

16. The optical system according to claim 15, wherein an angular distance of the three recesses to each other, with reference to the center of the circle, is 120 degrees.

17. The optical system according to claim 11, further comprising an optical holder having an internal surface for defining an internal cavity, the at least one optical element being housed in the internal cavity;

wherein the first portion of each centering wire pushes against the internal surface of the optical holder when each centering wire is heated to change the first cross-sectional shape to the second cross-sectional shape.

18. The optical system according to claim 11, wherein the first cross-sectional shape being a circle;

the second cross-sectional shape having the first portion and a second portion having a circular cross-sectional shape; and the smaller cross-sectional dimension of the first portion is less than a diameter of the second portion.

* * * * *